United States Patent
Jeong et al.

(10) Patent No.: US 11,091,074 B1
(45) Date of Patent: Aug. 17, 2021

(54) VENTILATION STRUCTURE OF SEATBACK

(71) Applicants: Hyundai Motor Company, Seoul (KR); Kia Motors Corporation, Seoul (KR); Hyundai Transys Inc., Chungcheongnam-do (KR)

(72) Inventors: Dong-Woo Jeong, Gyeonggi-do (KR); Tae-Uk Kang, Seoul (KR); Sang-Ho Kim, Incheon (KR); Seung-Young Lee, Gyeonggi-do (KR); Yeong-Sik Kim, Seoul (KR); Yun-Ho Kim, Gyeonggi-do (KR); Ho-Sub Lim, Seoul (KR)

(73) Assignees: Hyundai Motor Company, Seoul (KR); Kia Motors Corporation, Seoul (KR); Hyundai Transys Inc., Chungcheongnam-do (KR)

( * ) Notice: Subject to any disclaimer, the term of this patent is extended or adjusted under 35 U.S.C. 154(b) by 0 days.

(21) Appl. No.: 17/101,782

(22) Filed: Nov. 23, 2020

(30) Foreign Application Priority Data

Feb. 13, 2020 (KR) .......................... 10-2020-0017718

(51) Int. Cl.
 *B60N 2/56* (2006.01)
 *B60N 2/68* (2006.01)
 *B60N 2/58* (2006.01)

(52) U.S. Cl.
 CPC ............. *B60N 2/5657* (2013.01); *B60N 2/58* (2013.01); *B60N 2/68* (2013.01)

(58) Field of Classification Search
 CPC .... B60N 2/5635; B60N 2/5657; B60N 2/565; B60N 2/56

USPC ....................................................... 297/180.13
See application file for complete search history.

(56) References Cited

U.S. PATENT DOCUMENTS

| | | | |
|---|---|---|---|
| 5,102,189 A | 4/1992 | Saito et al. | |
| 6,736,452 B2* | 5/2004 | Aoki ................... | B60H 1/00285 |
| | | | 297/180.13 |
| 6,929,322 B2* | 8/2005 | Aoki ................... | B60H 1/00285 |
| | | | 297/180.13 |
| 6,976,734 B2 | 12/2005 | Stoewe | |

(Continued)

FOREIGN PATENT DOCUMENTS

| | | |
|---|---|---|
| JP | 2004-224108 A | 8/2004 |
| JP | 2007-137185 A | 6/2007 |

(Continued)

*Primary Examiner* — Shin H Kim
(74) *Attorney, Agent, or Firm* — Mintz Levin Cohn Ferris Glovsky and Popeo, P.C.; Peter F. Corless

(57) ABSTRACT

A ventilation structure of a vehicle seat is configured to circulate indoor air of a vehicle through a seatback via a blower mounted on the seatback in a dual blower type of ventilation structure. This structure includes the seatback including a seatback pad having an exhaust hole and a seatback board having an intake hole, a seatback blower mounted on the seatback pad and providing a blowing force to introduce outdoor air of the seatback through the intake hole and then discharge the outdoor air to the exhaust hole, an intake duct mounted on the seatback board and providing a path to move the outdoor air of the seatback introduced into the intake hole, and a flexible duct connecting the seatback blower and the intake duct and deformable by a movement of the seatback while maintaining connection of the seatback blower and the intake duct.

8 Claims, 7 Drawing Sheets

(56) References Cited

U.S. PATENT DOCUMENTS

| | | | | |
|---|---|---|---|---|
| 8,167,368 B2* | 5/2012 | Eckel | ............... | B60N 2/565 |
| | | | | 297/180.14 |
| 8,752,892 B2 | 6/2014 | Sahashi | | |
| 10,123,628 B2* | 11/2018 | Ishii | ............... | B60N 2/5657 |
| 10,240,607 B2* | 3/2019 | Wheeler | ............... | F04D 29/281 |
| 10,293,720 B2 | 5/2019 | Okimura et al. | | |
| 10,603,976 B2* | 3/2020 | Androulakis | ......... | B60H 1/3204 |
| 10,856,664 B2* | 12/2020 | Bhatia | ............... | A47C 27/125 |
| 2003/0102699 A1* | 6/2003 | Aoki | ............... | B60N 2/5657 |
| | | | | 297/180.14 |
| 2011/0226461 A1* | 9/2011 | Fujii | ............... | B60H 1/00285 |
| | | | | 165/200 |
| 2013/0137354 A1* | 5/2013 | Tsuzaki | ............... | B60N 2/5635 |
| | | | | 454/75 |
| 2015/0210193 A1* | 7/2015 | Kurosawa | ............... | B60N 2/5657 |
| | | | | 297/180.13 |
| 2015/0274046 A1* | 10/2015 | Wang | ............... | B60N 2/80 |
| | | | | 297/180.13 |
| 2015/0329027 A1* | 11/2015 | Axakov | ............... | B60N 2/565 |
| | | | | 297/180.13 |
| 2017/0028886 A1* | 2/2017 | Zhang | ............... | B60N 2/5657 |
| 2017/0248146 A1* | 8/2017 | Wheeler | ............... | F04D 25/06 |
| 2017/0361742 A1* | 12/2017 | Craig | ............... | B60N 2/5642 |
| 2018/0020838 A1* | 1/2018 | Ishii | ............... | F04D 29/162 |
| | | | | 297/180.13 |
| 2018/0147962 A1* | 5/2018 | Longatte | ............... | B60N 2/5657 |

FOREIGN PATENT DOCUMENTS

| | | |
|---|---|---|
| JP | 2019-151245 A | 9/2019 |
| KR | 101200755 B1 | 11/2012 |

\* cited by examiner

VENTILATION STRUCTURE OF SEATBACK

CROSS-REFERENCE TO RELATED APPLICATION

This application claims under 35 U.S.C. § 119(a) the benefit of Korean Patent Application No. 10-2020-0017718, filed on Feb. 13, 2020, the entire contents of which are incorporated herein by reference.

BACKGROUND

(a) Technical Field

The present disclosure relates to a ventilation structure of a seatback, more particularly, to the ventilation structure configured to circulate indoor air of a vehicle through the seatback via a blower mounted on the seatback in a dual blower type of ventilation structure.

(b) Description of the Related Art

In a vehicle such as an automobile, each seat typically is divided into a seat cushion to support a load of a passenger's lower body, and a seatback to support a load of the passenger's upper body.

Furthermore, the seat cushion and the seatback forming the seat may include a cushion pad that has optimum elasticity to afford comfort, and a cushion cover that covers the cushion pad to protect the cushion pad from contamination.

The seat configured as described above adopts a seat ventilation structure that sucks cold air supplied from an HVAC (Heating, Ventilation & Air Conditioning) of the vehicle into the seat and then circulates the cold air through the seat so as to obtain optimum cooling performance. The seat ventilation structure applied to the vehicle may be classified into a single blower type of ventilation structure and a dual blower type of ventilation structure.

Referring to FIG. 1A (RELATED ART), the single blower type of ventilation structure is configured such that a blower 4 is mounted on a seat cushion 10 and cold air supplied from a vehicle HVAC is transmitted through a vehicle-body duct 2 installed in a vehicle floor to the seat cushion 10 and a seatback 20. The cold air transmitted to the seatback 20 flows along a seatback duct 23 installed in a space between a seatback pad 22 and a seatback board 24 and then is discharged to a vent hole of a cushion cover.

An example of the single blower type of ventilation structure is disclosed in Korean Patent No. 10-1200755 (Seat Air Conditioner for Vehicle). According to this reference, in order to solve a structural problem caused by the blower mounted on every seat in the conventional single blower type of ventilation structure, some of air supplied through a console duct to a rear seat is discharged through ventilation paths provided in the seat cushion and the seatback.

However, since the single blower type of ventilation structure is configured such that the blower is not mounted on the seatback 20, a volume of the cold air discharged from the seatback 20 is low. Furthermore, a separate duct is installed in the seatback 20, so that a volume of the seatback 20 increases, and consequently a space for the rear seat is undesirably reduced.

In order to solve the above-mentioned problems, a dual blower type of ventilation structure in which a separate blower is installed in the seatback 20 has been developed.

Referring to FIG. 1B (RELATED ART), the dual blower type of ventilation structure is configured such that the seatback duct 23 is removed from the single blower type of ventilation structure and the blower is installed in the seatback 20, thus obtaining an air volume higher than that of the single blower type of ventilation structure and making the seatback 20 relatively slim.

One of important attributes of the ventilation structure of the seatback is providing adequate temperature drop performance to a passenger in the vehicle. However, the interior of the seatback 20 is a slightly closed space, so that the temperature of air inside the seatback 20 is higher than that of air outside the seatback 20. The dual blower type of ventilation structure is problematic in that the temperature of air discharged from the seatback 20 typically is higher than that of air in the vehicle, so that heat exchange between the air and the cold air supplied from the vehicle HVAC is not sufficiently performed.

SUMMARY

The present disclosure has been made to solve the above-mentioned problems in a dual blower type of ventilation structure and proposes a simple structure capable of absorbing and discharging cold air, supplied from an HVAC of a vehicle through a vehicle-body duct, into a seatback.

According to one aspect of the disclosure, the present disclosure provides a ventilation structure of a seatback, including: a seatback including a seatback pad having an exhaust hole and a seatback board having an intake hole; a seatback blower mounted on the seatback pad and providing a blowing force to introduce outdoor air of the seatback through the intake hole into the seatback and then discharge the outdoor air to the exhaust hole; an intake duct mounted on the seatback board and providing a path to move the outdoor air of the seatback introduced into the intake hole; and a flexible duct connecting the seatback blower and the intake duct to prevent indoor air of the seatback from being discharged to the exhaust hole, the flexible duct being deformable by movement of the seatback while maintaining connection of the seatback blower and the intake duct.

The intake hole may be formed in a top bent part of a pocket recess that is formed in the seatback board, and the top bent part of the pocket recess may be inclined towards an inside of the seatback board in a direction from an upper position to a lower position.

The intake duct may include an inlet port having a shape to cover the intake hole, with a space being defined in a side of the inlet port to move the outdoor air of the seatback; and a connector having a duct connecting hole connected to the seatback blower.

A protruding portion may be formed on an outer circumference of the duct connecting hole to catch the flexible duct.

A fan whose blade is rotated may be formed on the seatback blower, and a protruding portion may be formed on an outer circumference of the fan to catch the flexible duct.

The protruding portions formed on the duct connecting hole and the fan may be inserted into both sides of the flexible duct, respectively.

The present disclosure is advantageous in that the intake duct is installed in the seatback, so that only the outdoor air can be circulated through the seatback.

Furthermore, the present disclosure is advantageous in that the intake hole is formed in the top bent part of the pocket recess, so that this cannot be seen by a passenger sitting in the rear seat and thereby an excellent appearance is realized.

Furthermore, the present disclosure is advantageous in that the flexible duct connects the seatback blower and the intake duct, so that the outdoor air can be reliably circulated even if the seatback blower is moved by the motion of the seatback.

Furthermore, the present disclosure is advantageous in that the flexible duct is naturally connected when the seatback board and the seatback pad are assembled with each other, thus facilitating a mounting process.

DETAILED DESCRIPTION

Figure 1A:
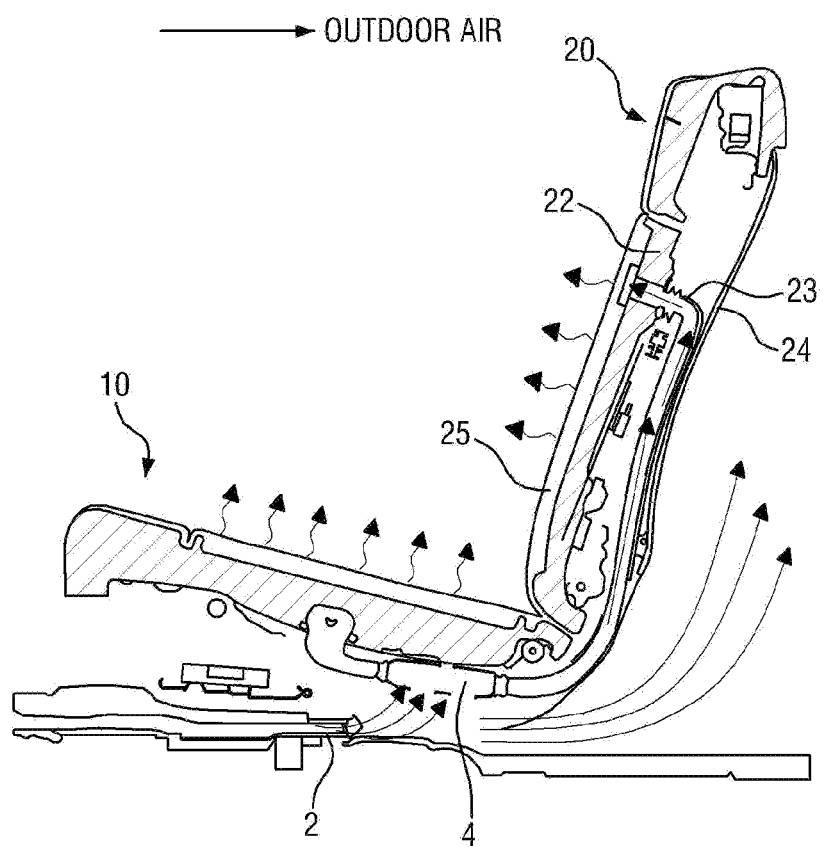
FIG. 1A (RELATED ART) is a diagram illustrating a conventional single blower type of ventilation structure in which a blower is mounted on only a seat cushion.
Figure 1B:
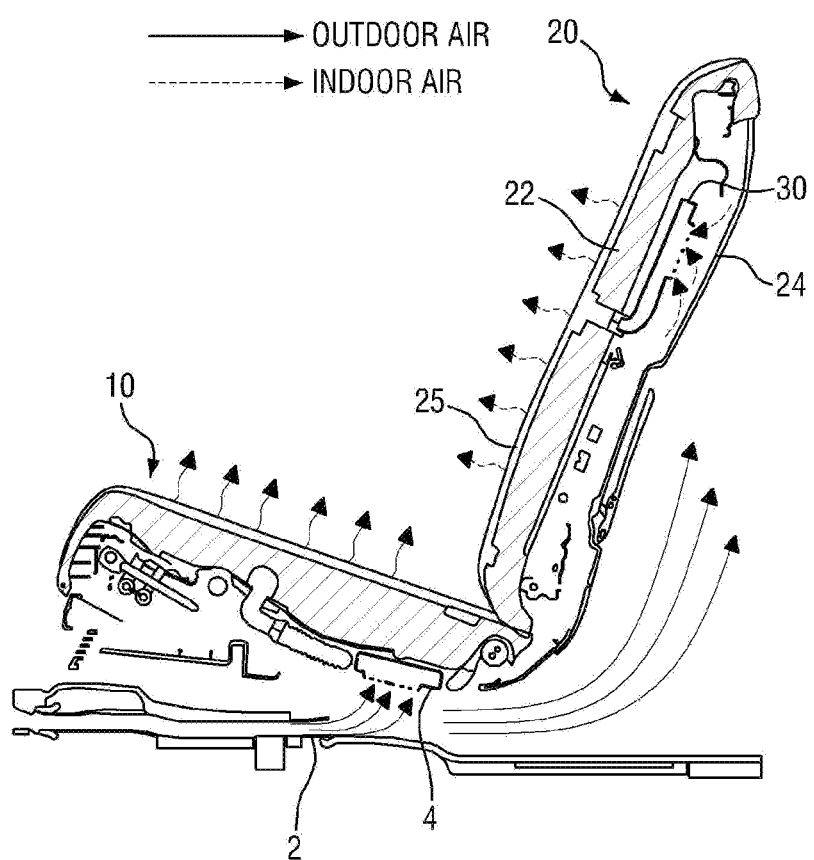
FIG. 1B (RELATED ART) is a diagram illustrating a conventional dual blower type of ventilation structure in which blowers are mounted on a seat cushion and a seatback.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of a ventilation structure of a seatback in accordance with the present disclosure will be described in detail with reference to the attached drawings. Further, the terminology or words used in the description and claims of the disclosure should not be interpreted as being limited merely to common or dictionary meanings. On the contrary, they should be interpreted based on the meanings and concepts of the disclosure in keeping with the scope of the disclosure on the basis of the principle that the inventor(s) can appropriately define the concepts of terms so as to describe the disclosure in the best way.

A ventilation structure of a seatback according to an embodiment of the present disclosure has a dual blower type in which blowers are mounted on a seat cushion 10 and a seatback 200, respectively, to circulate outdoor air fed from a HVAC of a vehicle through the seat cushion 10 and the seatback 200. However, a structure for circulating the outdoor air through the blower mounted on the seat cushion 10 is the same as a known system. Therefore, the structure for circulating the outdoor air through the seatback 200 will be described herein.

Herein, outdoor air means cold air discharged from the HVAC of the vehicle. Air present inside the seatback 200 is referred to as "indoor air," while air present outside the seatback 200 is referred to as "outdoor air." Preferably, the indoor air and the outdoor air are separated from each other based on an entire vehicle seat. However, for the convenience of description, they are separated from each other based on the seatback 200.

Figure 2:
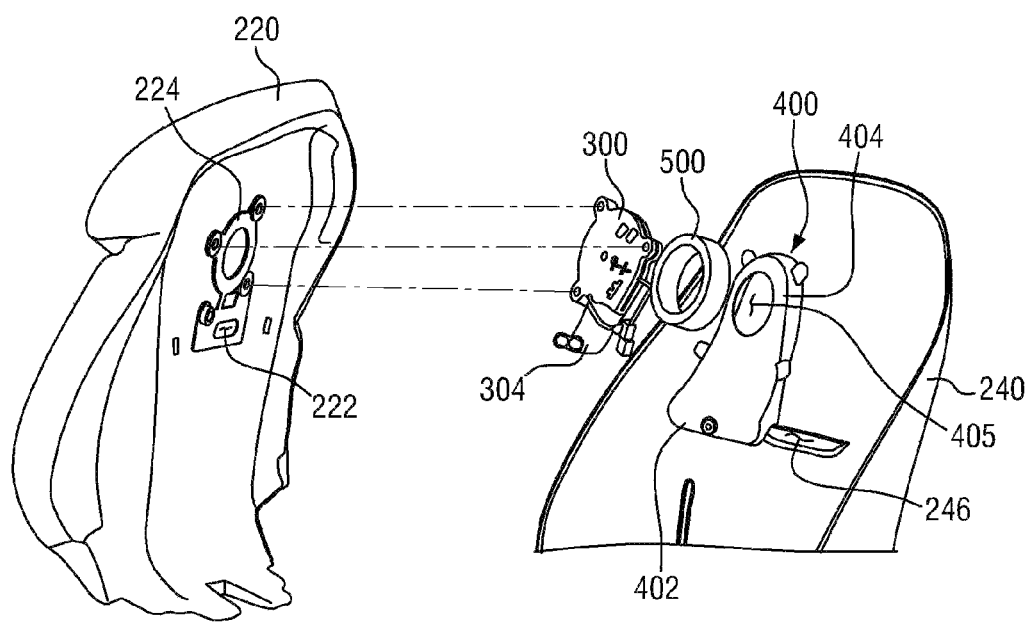
FIG. 2 is an exploded perspective view illustrating a ventilation structure of a seatback in accordance with an embodiment of the present disclosure.
Figure 3:
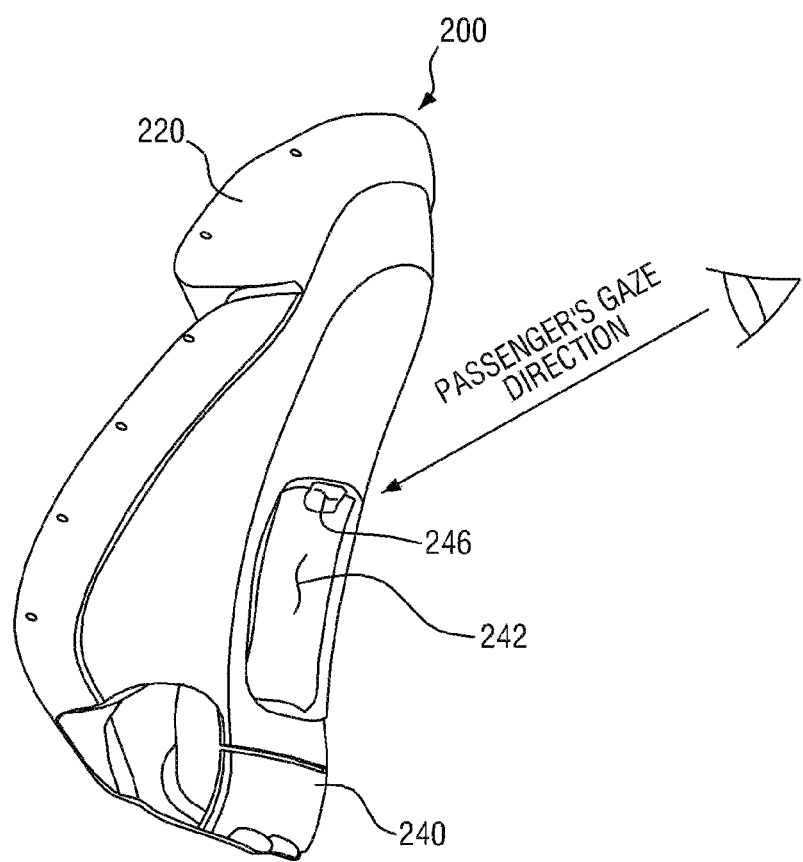
FIG. 3 is a diagram illustrating a state in which a passenger sitting in a rear seat of a vehicle looks at the seatback in the case of applying the ventilation structure of the seatback in accordance with the embodiment of the present disclosure.
Figure 4:
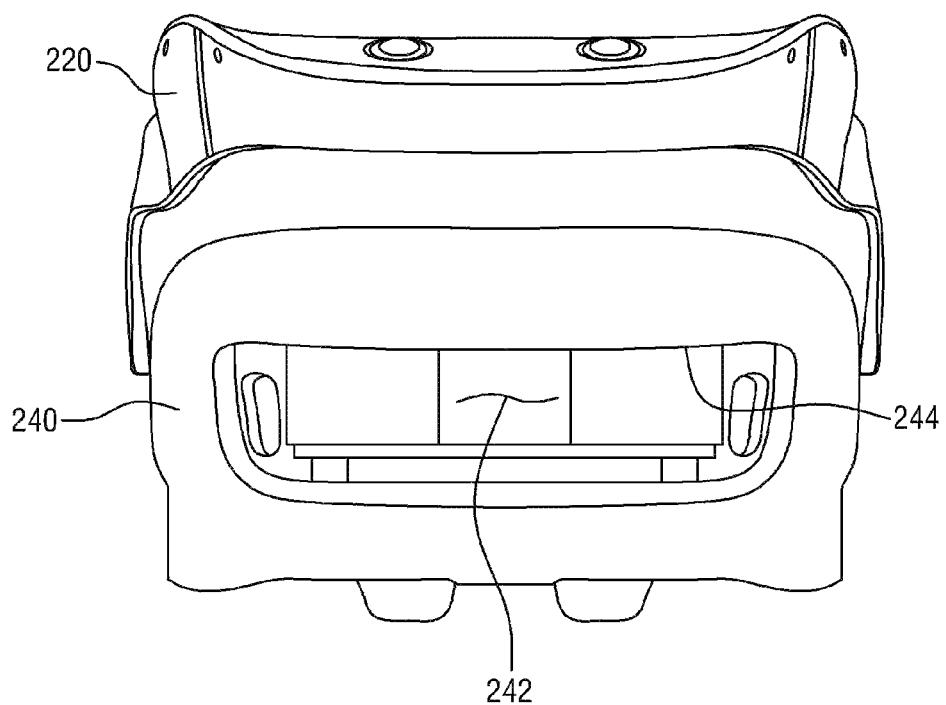
FIG. 4 is a diagram illustrating the seatback of FIG. 3 from the passenger's viewpoint.

FIG. 2 is an exploded perspective view illustrating a ventilation structure of a seatback in accordance with an embodiment of the present disclosure, FIG. 3 is a diagram illustrating a state in which a passenger sitting in a rear seat of a vehicle looks at the seatback in the case of applying the ventilation structure of the seatback in accordance with the embodiment of the present disclosure, and FIG. 4 is a diagram illustrating the seatback of FIG. 3 from the passenger's viewpoint.

Referring to FIG. 2, the ventilation structure of the seatback according to the embodiment of the present disclosure includes the seatback 200, a seatback blower 300, an intake duct 400, and a flexible duct 500.

The seatback 200 includes a seatback pad 220 and a seatback board 240. If the seatback pad 220 and the seatback board 240 are combined with each other, an accommodation space is defined therebetween. The seatback is configured such that the outdoor air is circulated in the accommodation space.

A mounting member 224 is fixedly mounted on a rear surface of the seatback pad 220. An exhaust hole 222 is formed through front and rear surfaces of the seatback pad 220. The mounting member 224 has the shape of an opening to communicate with the exhaust hole 222. The front surface of the seatback pad 220 is covered with a cushion cover 25. A vent hole (not shown) is formed in the cushion cover 25.

Referring to FIGS. 3 and 4, a pocket recess 242 used as a storage space is formed in the rear surface of the seatback board 240. A bent part depressed into the seatback board 240 is formed in an edge of the pocket recess 242. Although the pocket recess 242 is not limited to a particular shape, the pocket recess 242 is configured to have approximately a rectangular shape in an embodiment of the present disclosure. Therefore, the bent part formed in the pocket recess 242 has a top bent part 244, a bottom bent part, and side bent parts. Each bent part is inclined in a direction facing a central portion of the pocket recess 242. For example, the top bent part 244 is inclined towards an inside of the seatback board 240 in a direction from an upper position to a lower position. Of course, an inclination angle of the bent part may be variously set.

An intake hole 246 is formed in the seatback board 240 to pass through both the front surface and the rear surface thereof. Although a position of the seatback board 240 in which the intake hole 246 is formed is not limited to a specific position, it is preferable that the intake hole 246 be formed in the top bent part 244 in consideration of an appearance. In other words, a passenger sitting in the rear seat looks at the seatback board 240 obliquely in a direction from an upper position to a lower position. If the intake hole 246 is formed in the top bent part 244, the intake hole 246 is not visible to the passenger sitting in the rear seat.

The seatback blower 300 is a blowing device that simultaneously sucks and discharges the air. A fan 302 whose blade is rotated by a blowing force is provided on one side of the seatback blower 300, while a blower duct 304 is provided on the other side of the seatback blower 300 to provide a discharge path for the sucked air (see FIG. 5). The seatback blower 300 is coupled to the mounting member 224 to be secured to the seatback pad 220. In this case, the opening of the blower duct 304 is located to communicate with the exhaust hole 222.

Figure 6:
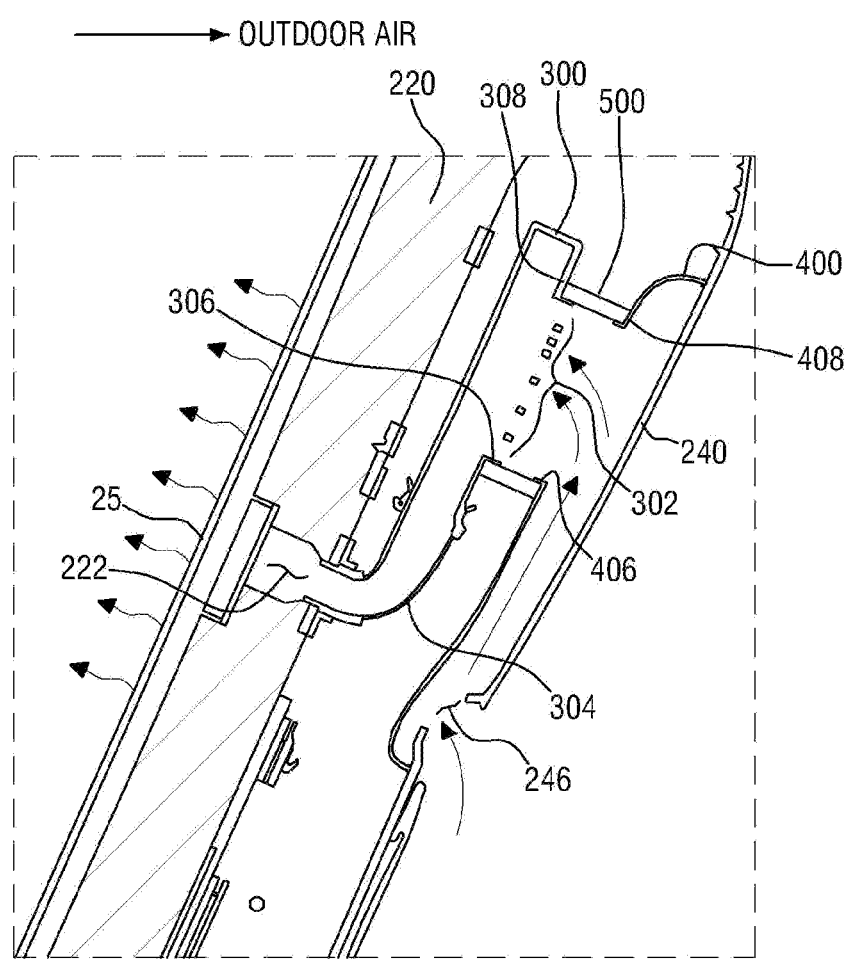
FIG. 6 is a diagram illustrating an air flow state in the ventilation structure of the seatback in accordance with the embodiment of the present disclosure.

A first protrusion 306 is formed on an outer circumference of the fan 302, and protrudes outwards to catch the flexible duct 500 (see FIG. 6). Furthermore, a first support 308 is formed on a side of the first protrusion 306 to support the flexible duct 500. Although the fan 302 is not limited to a specific shape, the fan 302 has approximately a circular shape in an embodiment of the present disclosure.

The intake duct 400 is mounted on the front surface of the seatback board 240 to define a space between the intake duct 400 and the seatback board 240, and includes an inlet port 402 and a connector 404.

The inlet port 402 is a part that guides the outdoor air introduced through the intake hole 246 into the intake duct 400, and has a shape that covers the intake hole 246. The inlet port 402 defines a space to prevent the outdoor air from flowing to one side (lower side) and allow the outdoor air to flow to the other side (upper side).

The connector 404 is a component that transmits the outdoor air while facing the fan 302 of the seatback blower 300, and has a duct connecting hole 405. A second protrusion 406 is formed on an outer circumference of the duct connecting hole 405, and protrudes outwards to catch the duct connecting hole 405 (see FIGS. 3 and 6). Furthermore, a second support 408 is formed on a side of the second protrusion 406 to support the flexible duct 500. Although the duct connecting hole 405 is not limited to a specific shape, the duct connecting hole 405 has approximately a circular shape in an embodiment of the present disclosure.

Except for the duct connecting hole 405 and the intake hole 246 in a state where the intake duct 400 is mounted on the seatback board 240, there is no space through which the outdoor air is discharged to an outside of the intake duct 400 or the indoor air is introduced into the intake duct 400.

The flexible duct 500 functions to connect the seatback blower 300 and the intake duct 400, and is a member that may be deformed by external force. The flexible duct 500 preferably is made of a porous material, such as sponge or bellows. If both sides of the flexible duct 500 are connected to the fan 302 and the duct connecting hole 405, the flexible duct 500 is not limited to a specific shape. However, in an embodiment of the present disclosure, the flexible duct 500 has the shape of a cylinder in which a hollow portion is formed.

A connecting process of the flexible duct 500 is as follows: if the first protrusion 306 is inserted into a hollow portion that is formed in one side of the flexible duct 500 and the second protrusion 406 is inserted into a hollow portion that is formed in the other side of the flexible duct 500, one end of the flexible duct 500 is supported by the first support 308 and the other end thereof is supported by the second support 408, so that the seatback blower 300 is connected to the intake duct 400.

Meanwhile, in another embodiment of the present disclosure, protruding portions other than the first protrusion 306 and the second protrusion 406 may be formed on the seatback blower 300 and the intake duct 400, and the flexible duct 500 may be configured to connect the protruding portions to each other.

Figure 5:
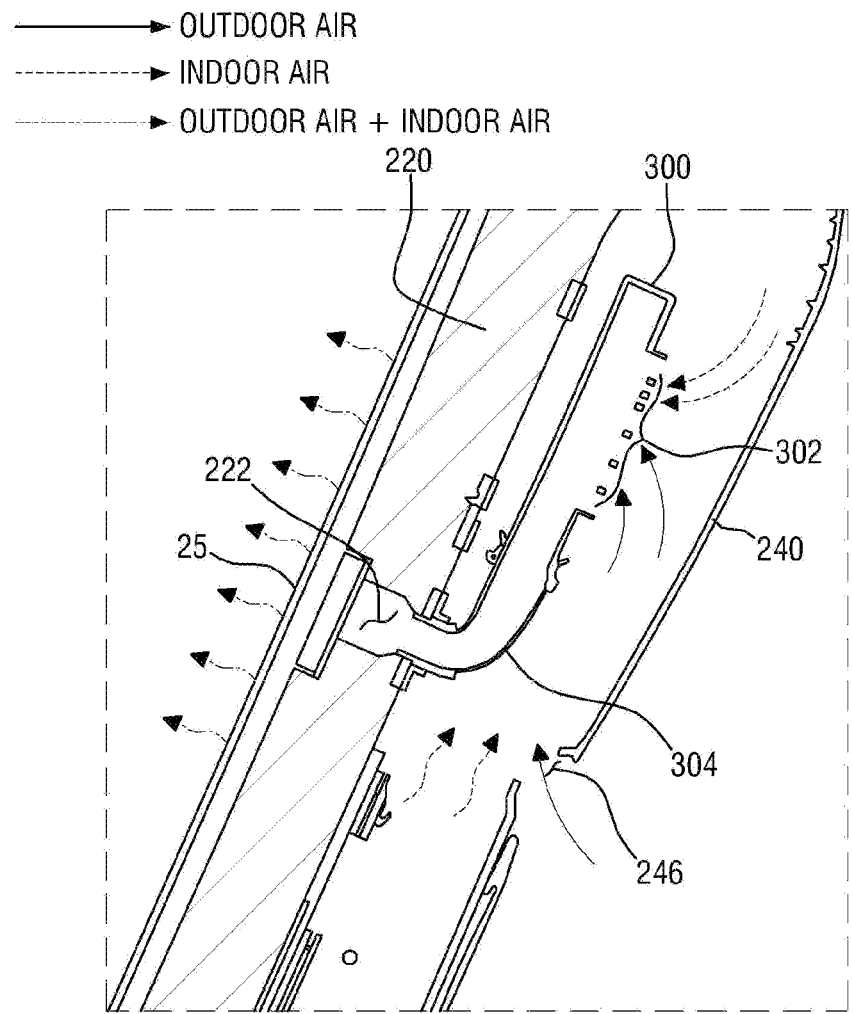
FIG. 5 is a diagram illustrating an air flow state in a ventilation structure of a seatback having no intake duct or flexible duct.

FIG. 5 is a diagram illustrating an air flow state in a ventilation structure of a seatback having no intake duct or flexible duct, and FIG. 6 is a diagram illustrating an air flow state in the ventilation structure of the seatback in accordance with the embodiment of the present disclosure.

Referring to FIG. 5, if there is no intake duct 400, air sucked into the seatback blower 300 is composed of outdoor air introduced through the intake hole 246 and indoor air present inside the seatback 200. Since the air discharged to the vent hole of the cushion cover 25 is a mixture of the outdoor air and the indoor air, this still has the problem of the conventional dual blower type of the seatback ventilation structure. In order to solve the above problems, according to an embodiment of the present disclosure, the intake duct 400 is further included in the ventilation structure of the seatback of FIG. 5.

Referring to FIG. 6, after the outdoor air introduced through the intake hole 246 is sucked along a moving path of the intake duct 400 to the seatback blower 300, the outdoor air is discharged through the exhaust hole 222. In this process, the indoor air may not be introduced into the seatback blower 300. Therefore, the air discharged to the vent hole of the cushion cover 25 is composed only on the outdoor air.

Meanwhile, a process of mounting the ventilation structure of the seatback according to the embodiment of the present disclosure is as follows. First, a worker fixes the seatback blower 300 to the seatback pad 220 and fixes the intake duct 400 to the seatback board 240, and then connects one side of the flexible duct 500 to the seatback blower 300 (or the intake duct 400). Subsequently, the seatback board 240 is assembled with the seatback pad 220. At this time, the other side of the flexible duct 500 is naturally connected to the intake duct 400 (or the seatback blower 300). Therefore, the process of mounting the ventilation structure of the seatback according to the embodiment of the present disclosure is easy.

In a state where the ventilation structure of the seatback according to the embodiment of the present disclosure is mounted, the seatback blower 300 may be moved rearwards by a passenger's load when he or she sits in the seat. In this case, since the connection between the seatback blower 300 and the intake duct 400 is maintained even if the flexible duct 500 is deformed, the circulation of the outdoor air can be continued.

Furthermore, the moving path of the outdoor air in the ventilation structure of the seatback according to the embodiment of the present disclosure is space between the intake duct 400 and the seatback board 240. Therefore, since it is unnecessary to excessively increase the internal space of the seatback 200, there is an effect of increasing the freedom degree of the design of the seatback 200.

Although the present disclosure was described with reference to specific embodiments shown in the drawings, it is apparent to those skilled in the art that the present disclosure may be changed and modified in various ways without departing from the scope of the present disclosure.

What is claimed is:

1. A ventilation structure of a vehicle seat, comprising:
   a seatback including a seatback pad having an exhaust hole and a seatback board having an intake hole;
   a seatback blower mounted on the seatback pad and providing a blowing force to introduce outdoor air of the seatback through the intake hole into the seatback and then discharge the outdoor air to the exhaust hole;
   an intake duct mounted on the seatback board and providing a path to move the outdoor air of the seatback introduced into the intake hole; and
   a flexible duct connecting the seatback blower and the intake duct to prevent indoor air of the seatback from being discharged to the exhaust hole, the flexible duct being deformable by movement of the seatback while maintaining connection of the seatback blower and the intake duct.

2. The ventilation structure of claim 1, wherein the intake hole is formed in a top bent part of a pocket recess that is formed in the seatback board.

3. The ventilation structure of claim 2, wherein the top bent part of the pocket recess is inclined towards an inside of the seatback board in a direction from an upper position to a lower position.

4. The ventilation structure of claim 1, wherein the intake duct comprises:
   an inlet port having a shape to cover the intake hole, with a space being defined in a side of the inlet port to move the outdoor air of the seatback; and
   a connector having a duct connecting hole connected to the seatback blower.

5. The ventilation structure of claim 4, wherein a protruding portion is formed on an outer circumference of the duct connecting hole to catch the flexible duct.

6. The ventilation structure of claim 5, wherein a fan whose blade is rotated is formed on the seatback blower, and a protruding portion is formed on an outer circumference of the fan to catch the flexible duct.

7. The ventilation structure of claim 6, wherein the protruding portions formed on the duct connecting hole and the fan are inserted into both sides of the flexible duct, respectively.

8. The ventilation structure of claim 1, wherein the flexible duct is made of a porous material.

* * * * *